United States Patent
Reed

(10) Patent No.: US 7,857,327 B2
(45) Date of Patent: Dec. 28, 2010

(54) CART SYSTEM CAPABLE OF BEING CONVERTED INTO A TABLE UTILIZING ONLY COMPONENTS OF THE CART

(75) Inventor: Greg Reed, 1031Steinbeck Dr., Hollister, CA (US) 95023

(73) Assignee: Greg Reed, Hollister, CA (US)

( * ) Notice: Subject to any disclaimer, the term of this patent is extended or adjusted under 35 U.S.C. 154(b) by 400 days.

(21) Appl. No.: 12/019,423

(22) Filed: Jan. 24, 2008

(65) Prior Publication Data
US 2009/0189361 A1   Jul. 30, 2009

(51) Int. Cl.
*B60N 2/28* (2006.01)
(52) U.S. Cl. .......................... 280/30; 106/11
(58) Field of Classification Search .................. 280/7.1, 280/7.17, 30, 47.18, 638; 108/11, 12, 13, 108/14, 18, 19; 297/1, 130, 240, 241, 312; 312/240, 241, 351.11, 351.12
See application file for complete search history.

(56) References Cited

U.S. PATENT DOCUMENTS

| | | | |
|---|---|---|---|
| 1,277,358 A * | 9/1918 | Baker | 280/7.17 |
| 2,603,500 A | 7/1952 | Messier | |
| D182,822 S * | 5/1958 | Kempner | D6/337 |
| 3,395,936 A | 8/1968 | Nicolli | |
| 3,940,175 A | 2/1976 | Robison | 296/22 |
| 4,471,969 A * | 9/1984 | Zabala et al. | 280/30 |
| 4,511,174 A | 4/1985 | Walker | 296/173 |
| 4,632,409 A * | 12/1986 | Hall et al. | 280/30 |
| 4,735,426 A | 4/1988 | McConnell | 280/87.01 |
| D299,796 S | 2/1989 | White | D6/337 |
| 5,201,536 A | 4/1993 | Bono et al. | 280/30 |
| 5,423,195 A * | 6/1995 | Peters | 62/457.7 |
| 5,480,170 A | 1/1996 | Kaiser, II | 280/30 |
| 5,489,107 A * | 2/1996 | Kho | 280/47.131 |
| 5,653,457 A * | 8/1997 | Marmer et al. | 280/30 |
| 5,653,458 A | 8/1997 | Chaparian | 280/30 |
| 5,660,403 A | 8/1997 | O'Neill et al. | 280/47.19 |
| 5,772,222 A * | 6/1998 | Sim et al. | 280/30 |
| 5,833,251 A | 11/1998 | Peck | 280/87.01 |
| 5,857,695 A | 1/1999 | Crowell | 280/651 |
| 6,152,461 A | 11/2000 | Dunks | 280/30 |
| 6,264,216 B1 | 7/2001 | Wilson | 280/30 |
| 6,354,611 B1 | 3/2002 | Mihalic et al. | 280/30 |
| 6,446,981 B1 | 9/2002 | Wise et al. | 280/7.17 |
| 6,648,349 B1 * | 11/2003 | Waller et al. | 280/47.35 |
| 6,663,202 B2 * | 12/2003 | Spann | 312/249.12 |
| 6,733,026 B1 * | 5/2004 | Robberson et al. | 280/415.1 |
| 6,811,180 B1 * | 11/2004 | Molliere | 280/652 |
| 7,334,802 B2 * | 2/2008 | Kaplan | 280/47.26 |
| 7,451,709 B2 * | 11/2008 | Swartfager et al. | 108/14 |
| 2007/0216116 A1 * | 9/2007 | Gallea et al. | 280/47.36 |

* cited by examiner

*Primary Examiner*—J. Allen Shriver, II
*Assistant Examiner*—Brodie Follman
(74) *Attorney, Agent, or Firm*—Zilka-Kotab. PC

(57) ABSTRACT

A cart system and method are provided, the cart capable of being converted to a table using only components of the cart, the cart including a base, four sides coupled to the base, and at least two wheels coupled to the base. In use, the cart is capable of being converted into a table and at least one seat, utilizing only components of the cart. Additionally, at least one of the wheels is utilized, at least in part, for the at least one seat.

21 Claims, 15 Drawing Sheets

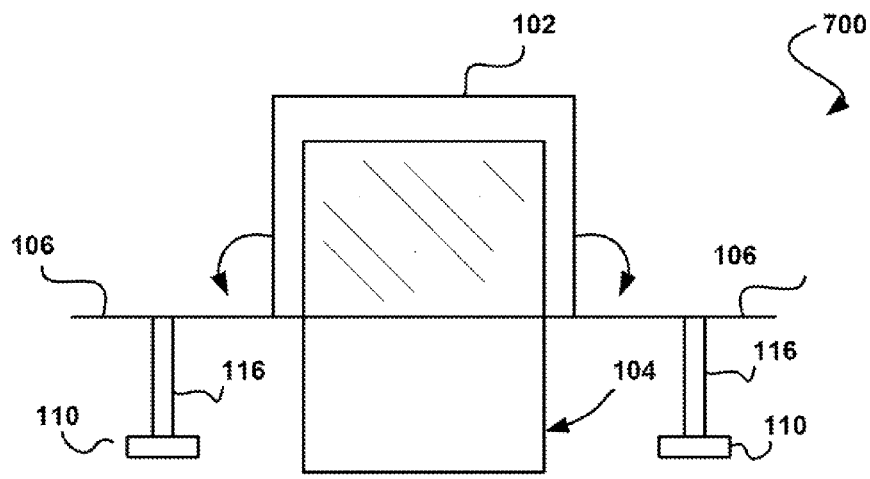
FIGURE 7
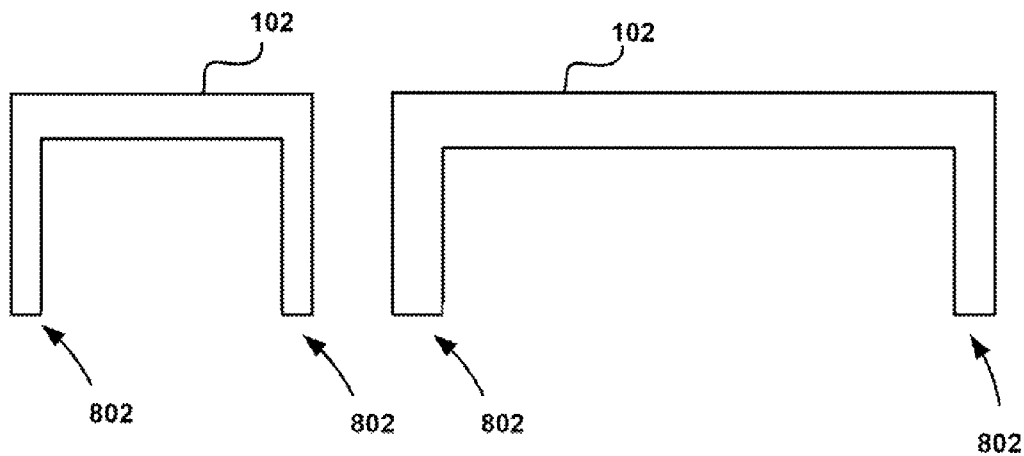
FIGURE 8A FIGURE 8B

US 7,857,327 B2

CART SYSTEM CAPABLE OF BEING CONVERTED INTO A TABLE UTILIZING ONLY COMPONENTS OF THE CART

FIELD OF THE INVENTION

The present invention relates to wheeled carts, and more particularly to multi-functional carts.

BACKGROUND

Often, carts are utilized to transport items from one point to another for efficiency purposes. In general, once the cart has been utilized to transport items from one point to another, the cart is set aside and remains unused. Furthermore, the cart is often used to transport tables and chairs which consume space that would otherwise be utilized for transporting other items.

There is thus a need for addressing these and/or other issues associated with the prior art.

SUMMARY

A cart system and method are provided, the cart capable of being converted to a table using only components of the cart, the cart including a base, four sides coupled to the base, and at least two wheels coupled to the base. In use, the cart is capable of being converted into a table and at least one seat, utilizing only components of the cart. In one approach, at least one of the wheels is utilized, at least in part, for the at least one seat.

Other aspects and advantages of the present invention will become apparent from the following detailed description, which, when taken in conjunction with the drawings, illustrate by way of example the principles of the invention

BRIEF DESCRIPTION OF THE DRAWINGS

FIG. 7 shows a side view of a cart that is capable of being converted into a table utilizing only components of the cart, in accordance with another embodiment.

FIGS. 8A and 8B show side views of part of a cart with detachable sides, in accordance with another embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of a cart system capable of being converted to a table, using only components of the cart.

In one general embodiment, a cart is provided including a base, four sides coupled to the base, and at least two wheels coupled to the base. In use, the cart is capable of being converted into a table and at least one seat, utilizing only components of the cart. Furthermore, at least one of the wheels is utilized, at least in part, for the at least one seat.

In another general embodiment, a method of converting a cart to a table using only components of the cart is provided. In operation, a cart is converted to a table using only components of the cart. Additionally, at least one wheel of the cart is utilized, at least in part, for at least one seat.

In another general embodiment, a cart is provided including a base, four sides coupled to the base, at least two wheels coupled to the base, an axle for coupling the at least two wheels to the base, a handle coupled to at least one component of the cart, and a cover for the cart. In use, the cart is capable of being converted into a table and at least one seat, utilizing only components of the cart. Additionally, at least one of the wheels is utilized as a base support for the at least one seat. Further, at least one of the sides is utilized for the at least one seat. Still yet, at least a portion of the axle is utilized to couple the at least one of the wheels to the at least one of the sides when the at least one of the wheels is being used as the base support for the at least one seat. In addition, the base is used for a top for the table. Furthermore, at least a portion of the handle is used as a support for the top of the table.

Figures 1, 1A:
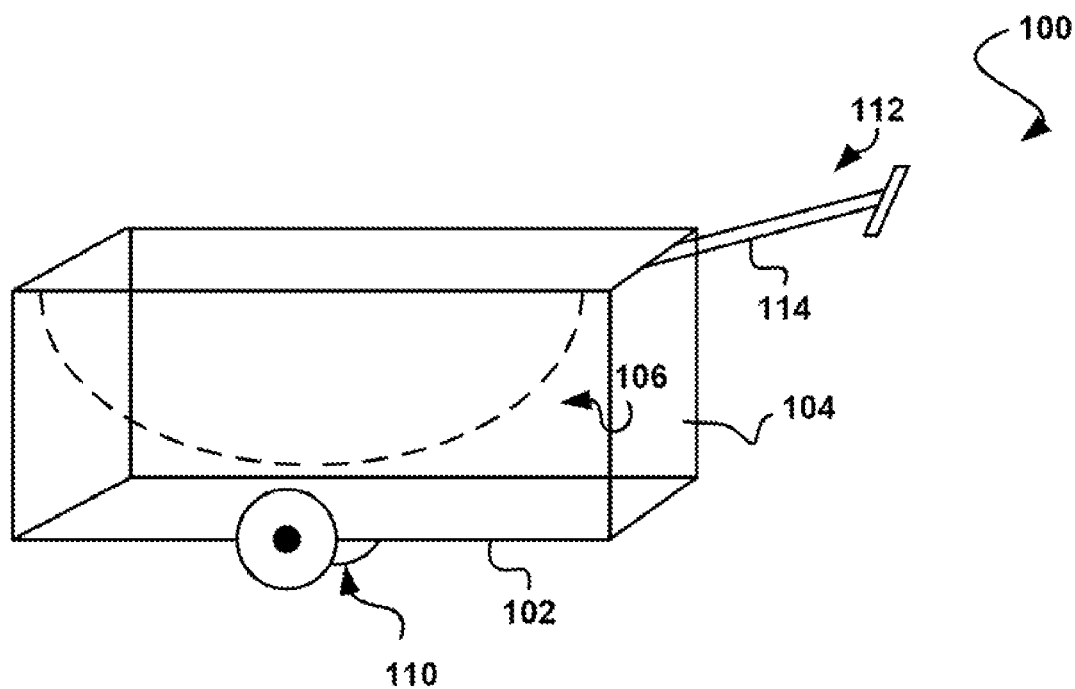
FIGS. 1A and 1B show a side view of a cart that is capable of being converted into a table utilizing only components of the cart, in accordance with one embodiment.
Figures 1, 1A, 2:
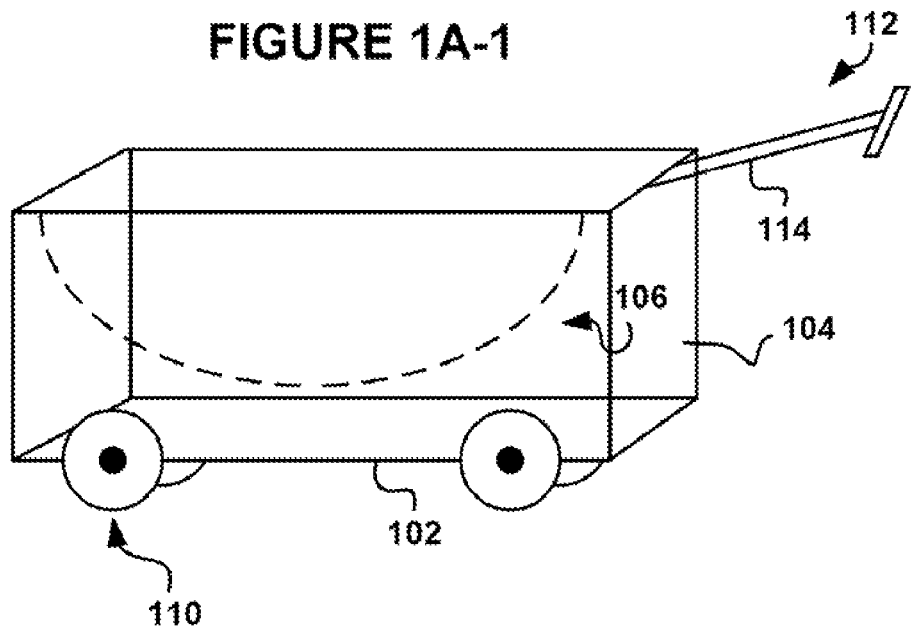
Figures 1, 1B:
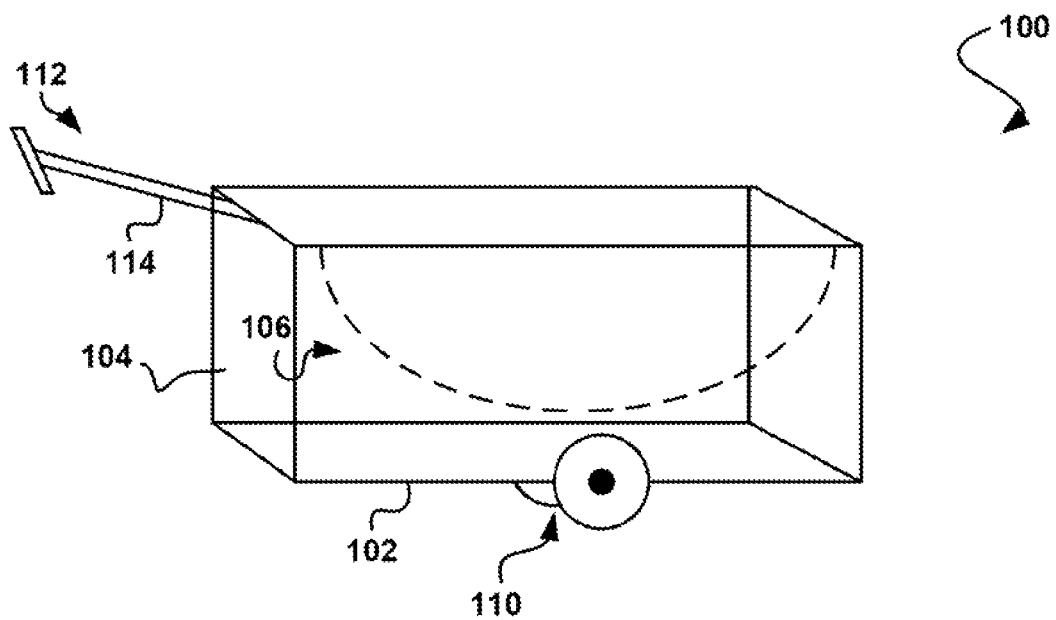
Figures 1, 1B, 2:
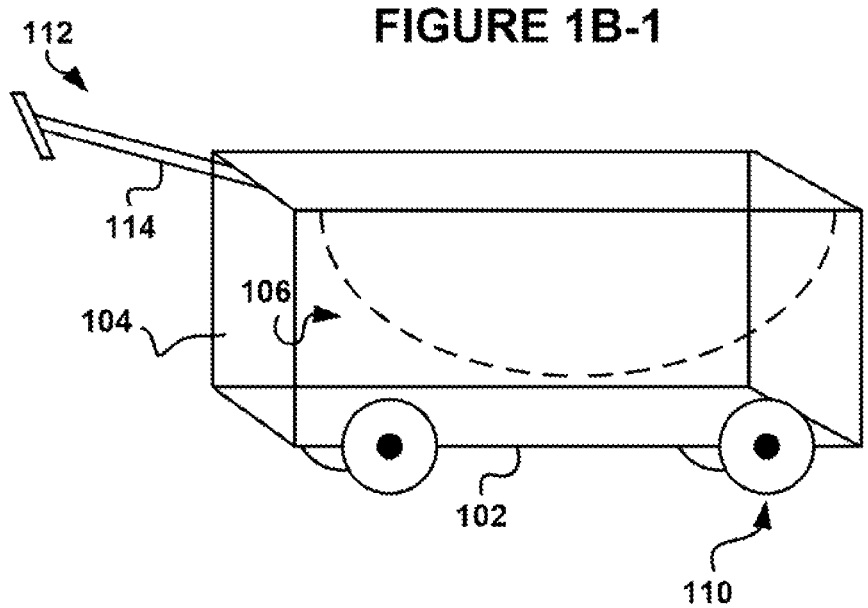

FIGS. 1A and 1B show a side view of a cart 100 that is capable of being converted into a table utilizing only components of the cart, in accordance with one embodiment. As shown, a base 102 is provided. Additionally, four sides 104-106 are provided, the sides 104-106 being coupled to the base 102.

Further, at least two wheels 110 are provided, the wheels being coupled to the base 102. Still yet, a handle 112 may be provided. As an option, the handle 112 may include a shaft 114 coupled to at least one component of the cart 100.

In use, the cart 100 is capable of being converted into a table and at least one seat, utilizing only components of the cart 100. Further, at least one of the wheels 110 is utilized, at least in part, for the at least one seat. In various embodiments, the sides 104-106 of the cart 100 may be detachable and/or rotatable and may serve, at least in part, for the at least one seat. Furthermore, as shown, the cart 100 may include two or more wheels in various embodiments (e.g. two wheels as shown in FIGS. 1A-1 and 1B-1, and four wheels shown in FIGS. 1A-2 and 1B-2, etc.).

Figures 1, 1C:
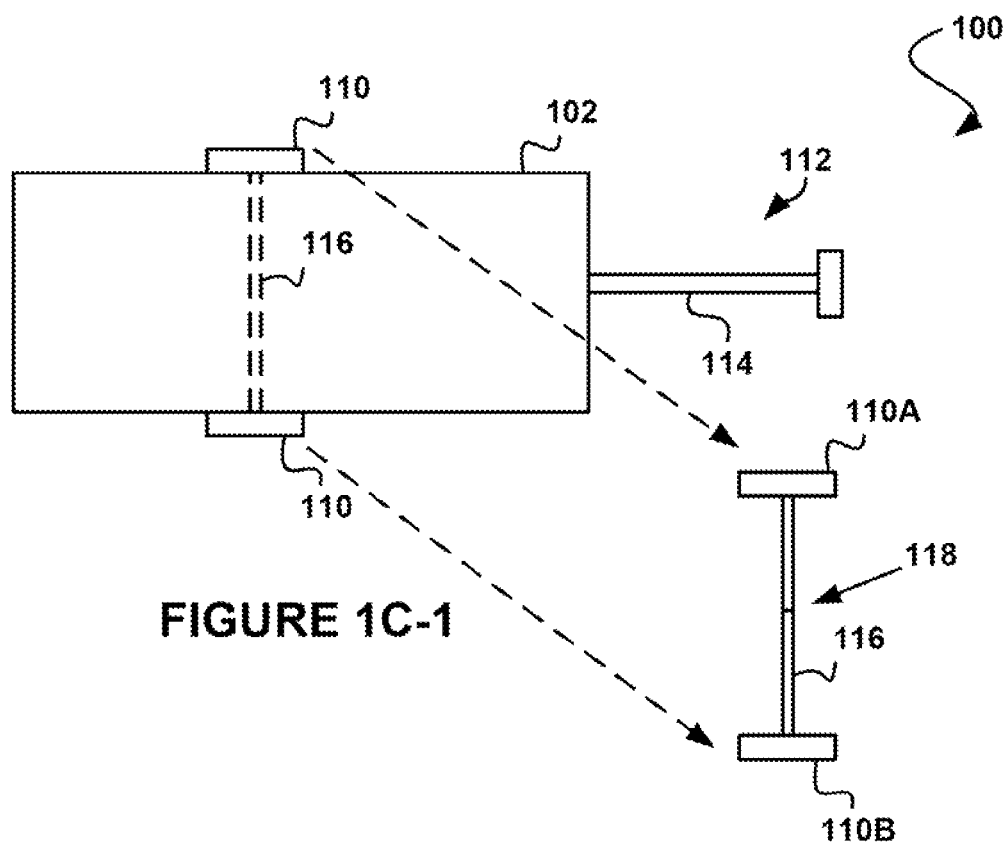
FIG. 1C shows a bottom-up view of the cart of FIGS. 1A and 1B, in accordance with one embodiment.
Figures 1, 1C, 2:
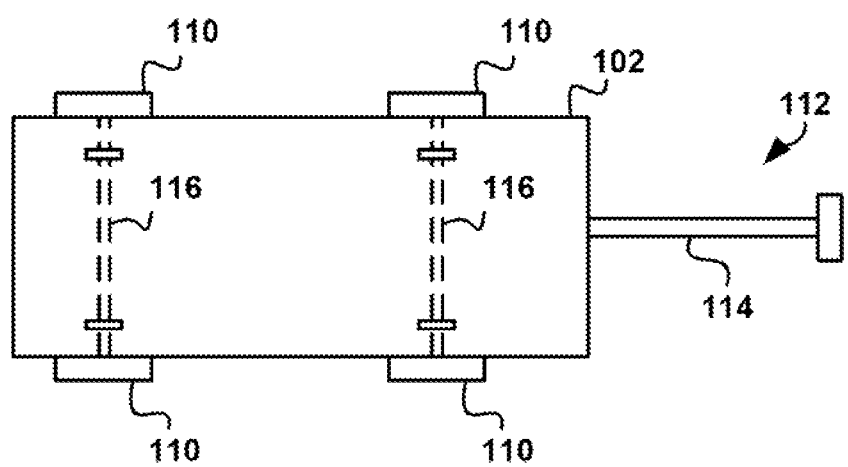

FIG. 1C shows a bottom-up view of the cart 100, in accordance with one embodiment. As shown, the cart 100 may further include an axle 116 for coupling the at least wheels 110 to the base 102. As an option, the axle 116 may be severable at a point 118 between a first wheel 110A and a second wheel 110B.

In one embodiment, the point 118 may be at or near the center point of the axle 116. Additionally, a length of a first and a second portion of the separated axle 116 may be adjustable. In this way, the first and second portion of the axle may be utilized as an adjustable seat post. As another option, the first wheel 110A and/or the second wheel 110B may be detachable from the axle 116.

More illustrative information will now be set forth regarding various optional architectures and features with, which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIGS. 2A-2F show side views of a cart 200 that is capable of being converted into a table utilizing only components of the cart, in accordance with one embodiment. As shown, at least one of the sides 106 may be utilized for a seat. In this case, one or both of the sides 106 may rotate about a pivot point at or near the top of the cart (i.e. away from the wheels) such that the sides 106 may serve as platform for bench seats.

Figure 2A:
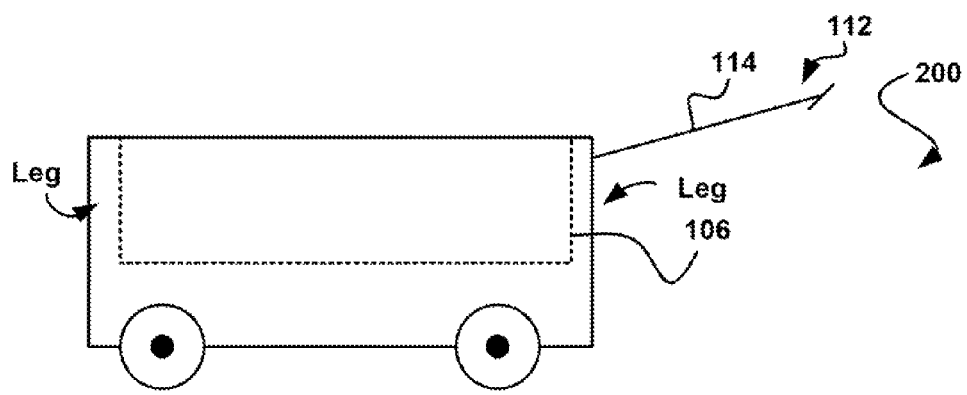
FIGS. 2A-2F show side views of a cart that is capable of being converted into a table utilizing only components of the cart, in accordance with another embodiment.
Figure 2B:
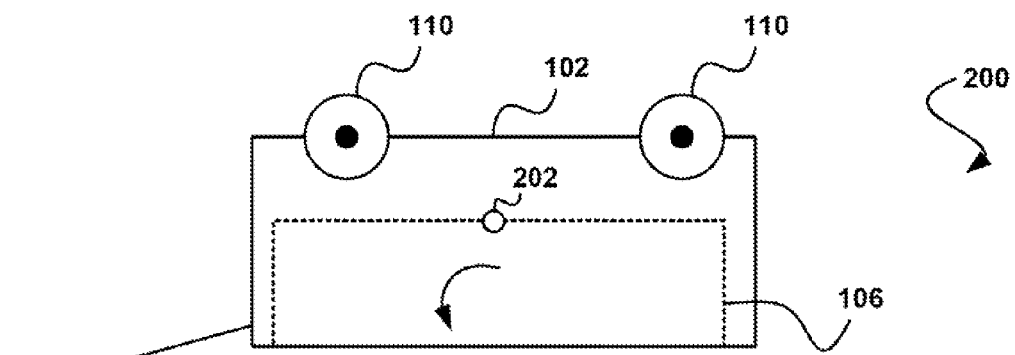
Figure 2C:
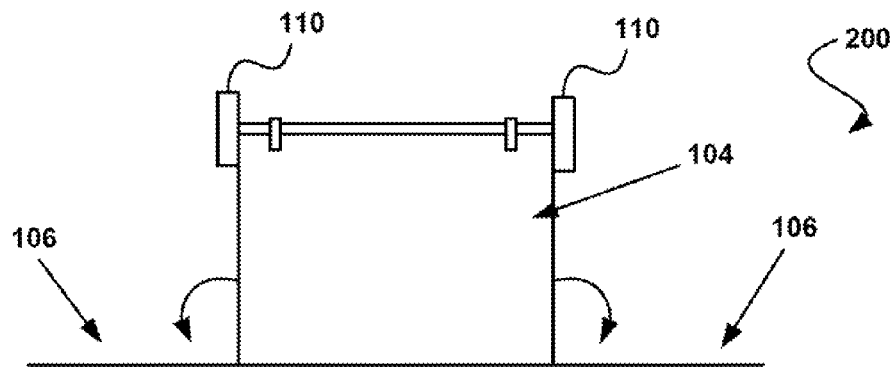
Figure 2D:
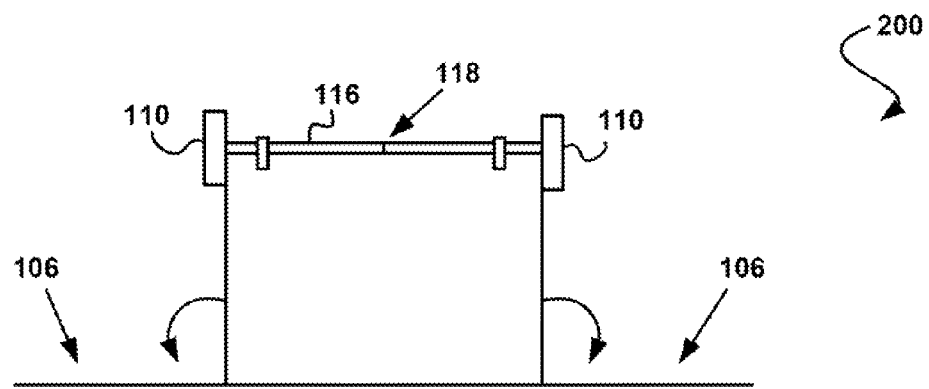

In use, the cart 200 may be flipped such that the attached wheels 110 are facing up, as shown in FIG. 2B. The sides 106 may rotate about a point positioned at the top of the cart 200, as shown in FIG. 2C. Various mechanical devices may be used to facilitate such rotation. For example, in one embodiment, at least one hinge may couple the side 106 to the base 102. In this case, the hinges may be positioned at the top of the cart 200 to allow for rotation.

In another embodiment, the side 106 may rotate about a pin or rod which is used to couple the side 106 to the base 102. Additionally, in cart formation, the sides 106 may be coupled to the base 102 in a number of ways. For example, the sides 106 may be coupled to the base 102 using a switch, Velcro, a latch, magnets, or any type of locking mechanism or fastener. In one embodiment, the locking mechanism or fastener may be positioned at a point 202 between the base 102 and the sides 106 and allow for an end of the side 106 to rotate outward away from the base 102 upon disengaging the locking mechanism or fastener. Furthermore, one or a plurality of locking mechanism or fasteners may be utilized.

As an option, all of the sides 104 and 106 may rotate or detach such that "legs" are left coupled to the base 102. In this case, the legs may serve as support when the cart 200 is in table formation. Furthermore, the sides may optionally pivot about these legs, in one embodiment (e.g. see FIG. 2A).

Figure 2E:
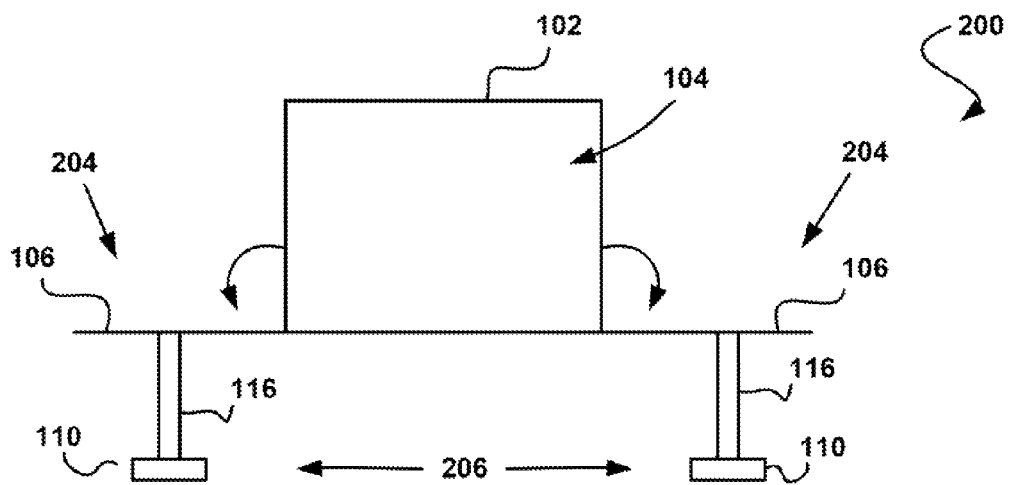

Additionally, the axle 116 may be detached at the point 118 between the two wheels 110 of the can 200 (e.g. see FIG. 2D) such that the axle 116 may be utilized to couple the side 106 and at least one of the wheels 110, forming at least one seat 204 as shown in FIG. 2E. In this way, the wheels 110 may be used as a base support 206 for the at least one seat 204. In one embodiment, a channel (e.g. a locking channel) or a stop may be utilized to provide additional support for the side 106, when the side 106 is being utilized as the seat 204. In this case, a component of the cart 100 (e.g. the base 102, etc.) may include the channel or the stop.

Figure 2F:
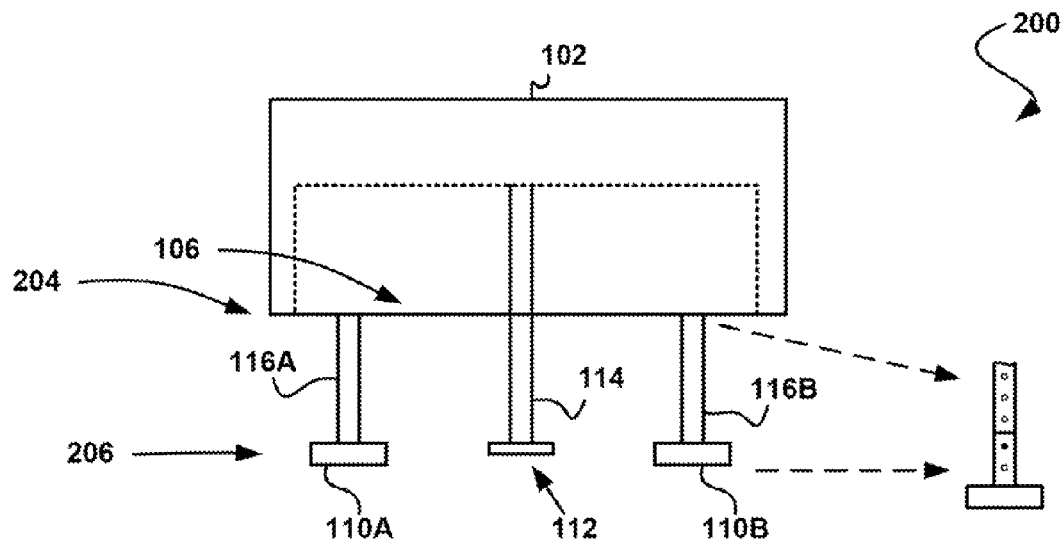

As an option, a first wheel 110A coupled to a first portion 116A of the separated axle 116 and a second wheel 110B couple to a second portion 116B of the separated axle 116 may each be utilized as the base support 206 for at least one side 106, forming the at least one seat 204 (e.g. see FIG. 2F). Additionally, as shown in FIG. 2F, the first portion 116A may be positioned towards a first end of the 106 and the second portion 116B may be positioned towards a second end of the 106 for providing the base support 206. In this case, positioning the portions towards an end refers to positioning the portions a distance away from a center point in a direction.

Further, in one embodiment, a length of the first and second portion 116A and 116B of the separated axle 116 may be adjustable. The axle 116 may be configured to be adjustable using a variety of techniques. For example, in one embodiment, a retractable pin and a plurality of holes may be utilized to adjust the length (e.g. see FIG. 2F). In another embodiment, the length may be adjusted by screwing a narrower portion of the axle 116 into a wider portion of the axle 116. In other various embodiments, any number of mechanisms may be utilized to adjust the length.

As an option, at least a portion of the handle 112 may be used as a support for the table, a first end of the shaft capable of being coupled to the top of the table. In other words, the shaft 114 may be capable of being coupled to the base 102 such that the shaft 114 acts as a table post or support and the base 102 serves as the top of the table. Coupling the shaft 114 to the base 102 may be implemented using various techniques. For example, in one embodiment, the base 102 may include an insert on one side such that the shaft 114 may be seated in the insert. As an option, the coupling may include utilizing a locking mechanism (e.g. a retractable pin, clamp, insertable pin, etc).

Figure 2G:
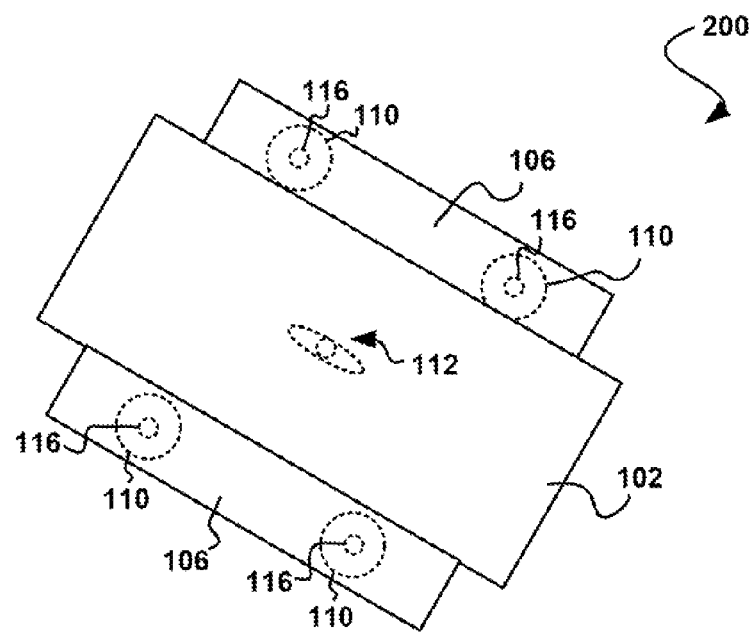
FIG. 2G shows a top-down view of the cart of FIGS. 2A-2F after being converted into a table, in accordance with one embodiment.

FIG. 2G shows a top-down view of the cart 200 after being converted into a table, in accordance with one embodiment. As shown, the cart 200 may be converted to a table using only components of the cart. As an option, the cart 200 may be configured such that all components utilized in the cart configuration are utilized when the cart 200 has been converted to the table. This may be accomplished using a variety of techniques. For example, the cart 200 maybe configured to utilize self-contained locking mechanisms or fasteners, permanently attached locking mechanisms or fasteners, easy/quick connect/disconnect items (e.g. PVC type inserts, snaps, etc.), retractable pins, etc.

Furthermore, in one embodiment, only the axles 116, the wheels 110, and the handle 112, may be removable from the cart 200. In another embodiment, the sides 106 and/or the sides 104 may also be removable to convert the cart 200 into a table.

Figure 3A:
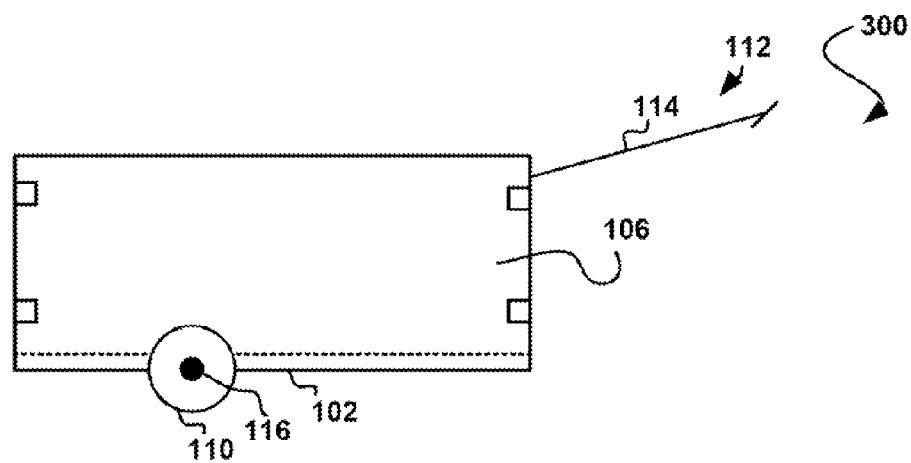
FIG. 3A shows a side view of a cart that is capable of being converted into a table utilizing only components of the cart, in accordance with another embodiment.
Figure 3B:
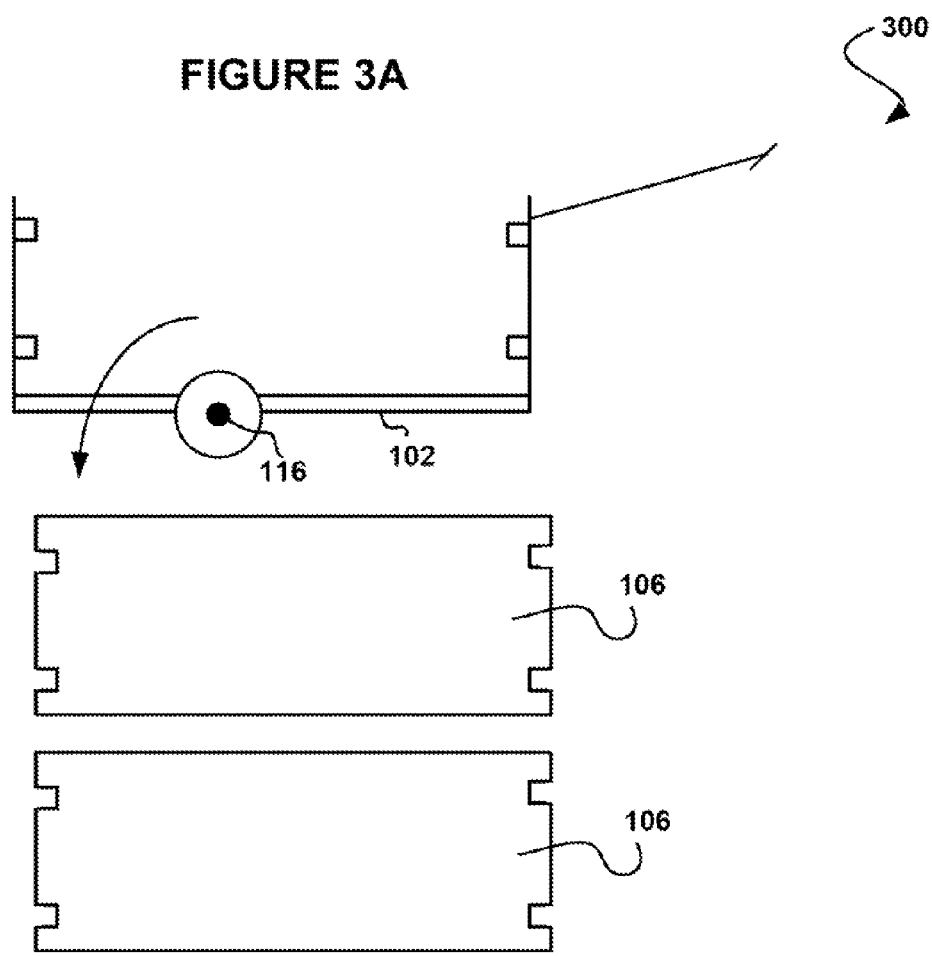
FIG. 3B shows a side view of the cart of FIG. 3A with detachable sides removed, in accordance with one embodiment.

FIG. 3A shows a side view of a cart 300 that is capable of being converted into a table utilizing only components of the cart, in accordance with another embodiment. As shown in FIG. 3B, at least one side 106 may be detached from the cart 300. In this case, the side 106 may detach using snaps or other quick connect disconnect fasteners.

As an option, the axle 116 may be used to couple the sides 106 to the base 102. For example, the axle 116 may be inserted through a hole in the sides 106. Thus, the sides 106 may be removed by removing the axle 116 through the hole. In this way, at least one of the sides 106 may be utilized as a base support for at least one seat.

Figure 3C:
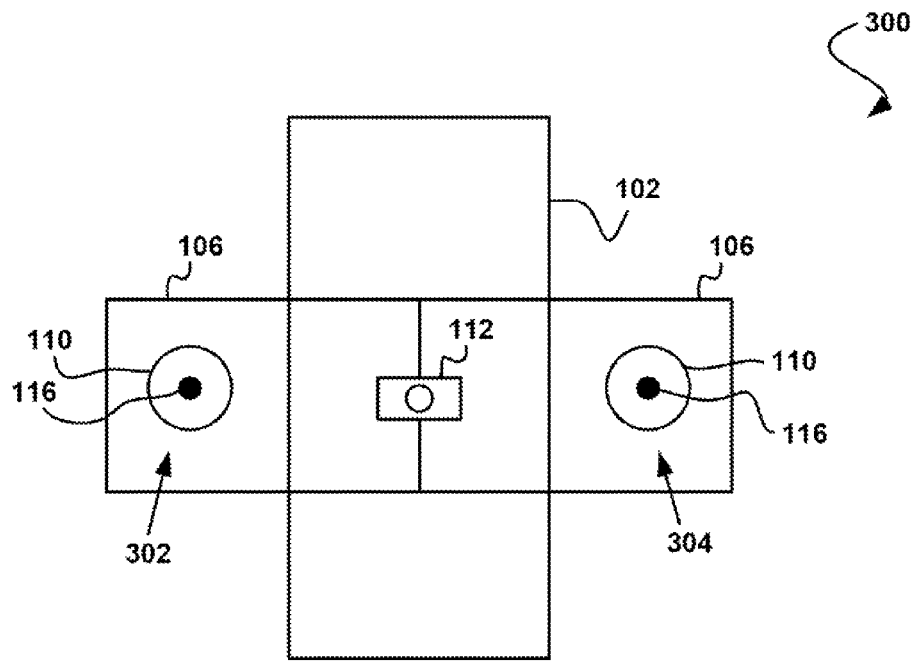
FIG. 3C shows a top-down view of the cart of FIG. 3A after being converted into a table, in accordance with one embodiment.
Figure 3D:
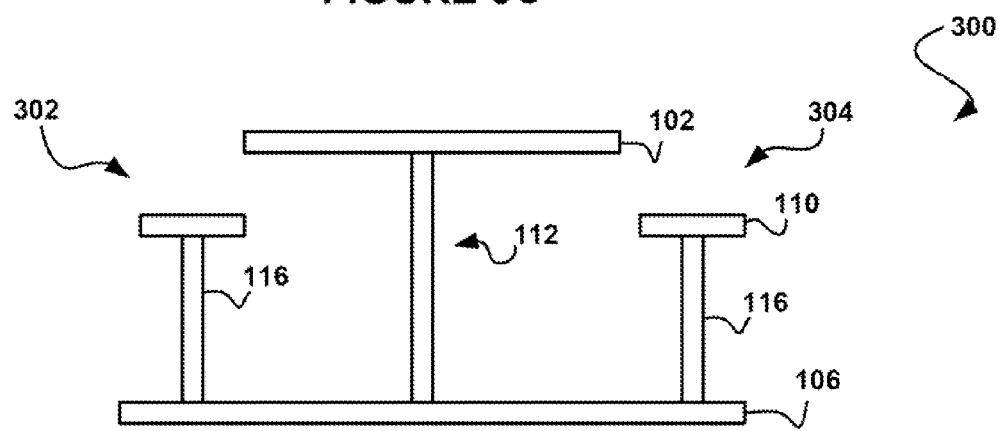
FIG. 3D shows a side view of the cart of FIG. 3A after being converted into a table, in accordance with one embodiment.

In one embodiment, the axle 116 may be separable at a point between a first wheel and a second wheel. In this case, a first portion of the axle 116 may be coupled to the first wheel 110 and a second portion of the axle 116 may be coupled to the second wheel 110. In this way, the first portion of the axle 116 and the first wheel 110 may be utilized as a first seat 302, and the second portion of the axle 116 and the second wheel 110 may be utilized as a second seat 304, as shown in FIGS. 3C and 3D.

As an option, at least one portion of the axle 116 may have an adjustable length. Using the adjustable length, a height of the seats 304 and 306 may be configured for different sized users. As another option, the length of the handle 112 may be adjusted. Such adjustment may be implemented using a variety of techniques such as a locking telescoping handle, retractable pins, etc.

Figure 4A:
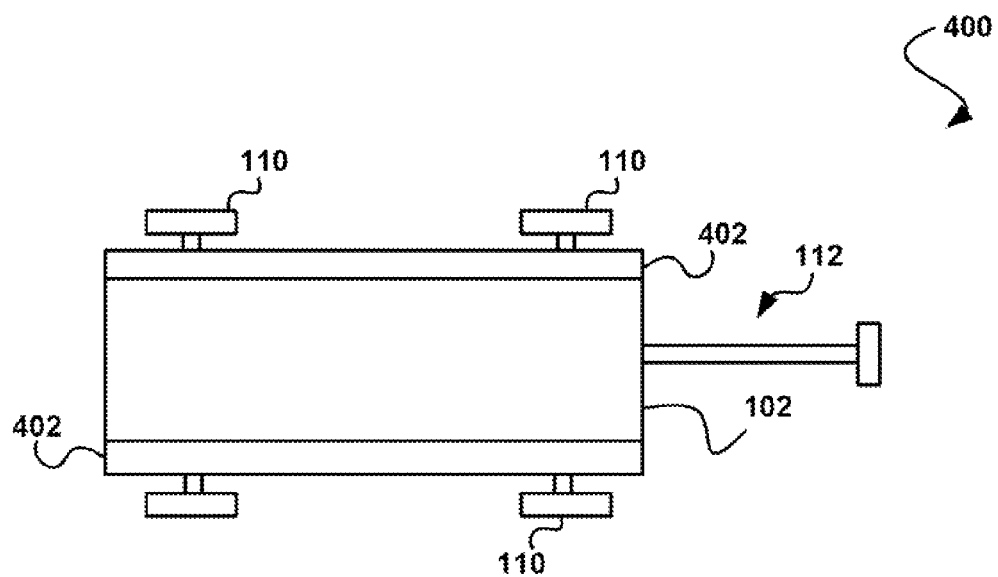
FIGS. 4A-4B show a bottom-up view of a cart that is capable of being converted into a table utilizing only components of the cart, in accordance with another embodiment.
Figure 4B:
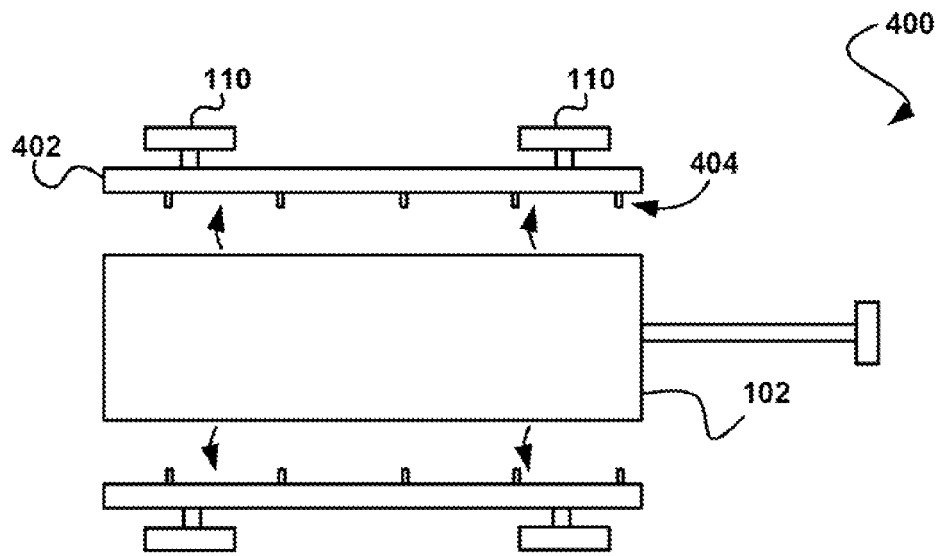

FIG. 4A shows a bottom-up view of a cart 400 that is capable of being converted into a table utilizing only components of the cart, in accordance with another embodiment. As shown in FIG. 4B, a portion 402 of the cart 400 including at least one of the wheels 110 may be detachable from the cart 400. For example, the portion 402 may detach using snaps 404 or other quick connect/disconnect fasteners. As an option, the portion 402 may fold upwards towards the top of the cart 400.

Figure 4C:
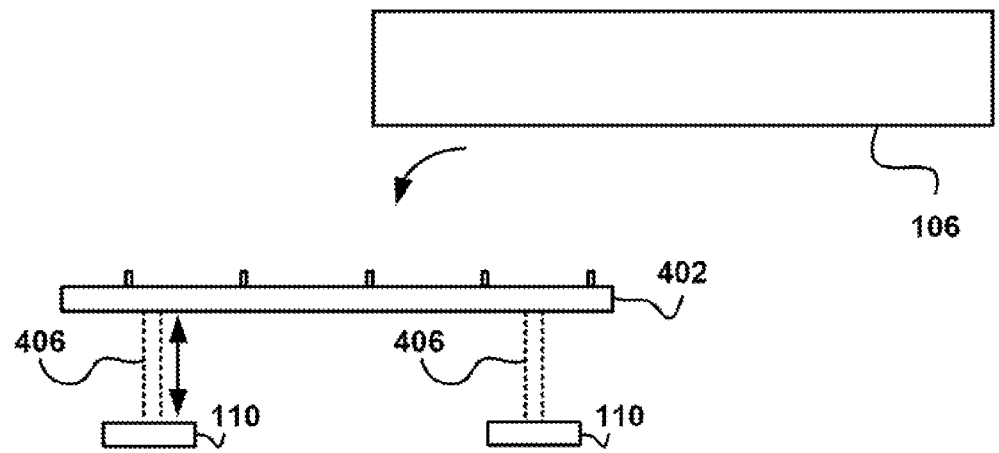
FIG. 4C shows a detachable portion and a side of the cart of FIG. 4A.

In this way, the portion 402 may be utilized as a seat or for a base support for a seat. For example, in one embodiment, the side 106 may be attached to the portion 402 such that the wheels 110 and the portion 402 serve as a base support for the side 106 (e.g. see FIGS. 4C and 4D). As an option, each of the wheels 110 may be attached to an extendable rod or pin 406 on which the wheels 110 rotate, or that rotates in conjunction with the wheels 110. The length of the pin 406 may be adjustable such that the portion 402 may be raised and lowered to conform to users of different sizes.

Figure 4D:
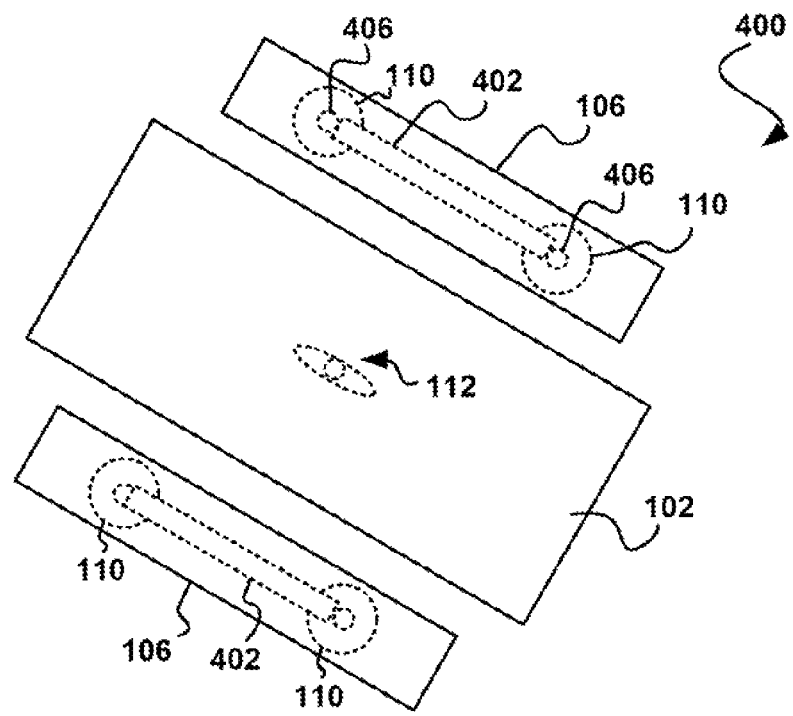
FIG. 4D shows a top-down view of the cart of FIG. 4A after being converted into a table, in accordance with one embodiment.

FIG. 4D shows a top-down view of the cart 400 after being converted into a table, in accordance with one embodiment. It should be noted that, although the seats are illustrated as separate from the base 102 in FIG. 4D, in another embodiment, the seats may be attached to the base 102 and/or other components of the cart 400.

Figure 5A:
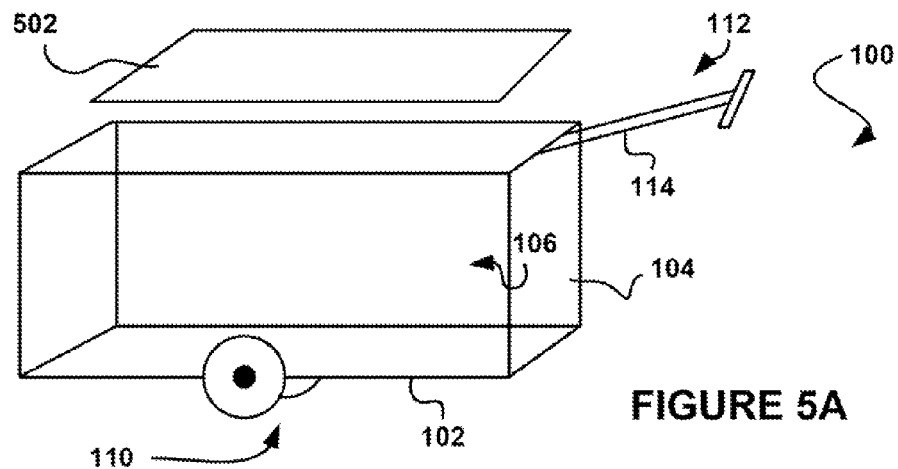
FIG. 5A shows a side view of the cart of FIG. 1A including a cover, in accordance with one embodiment.

It should be noted that the various functionality and components of FIGS. 1-4 may be implemented independently or in combination with the described functionality. Furthermore, various other components may be included with the embodiments described above. For example, as shown in FIG. 5A, the cart 100 may further include a cover 502 for the cart 100. Additionally, in various embodiments, the cover 502 may be capable of being utilized as a base support for the table (e.g. see FIGS. 5B-5D).

Figure 5B:
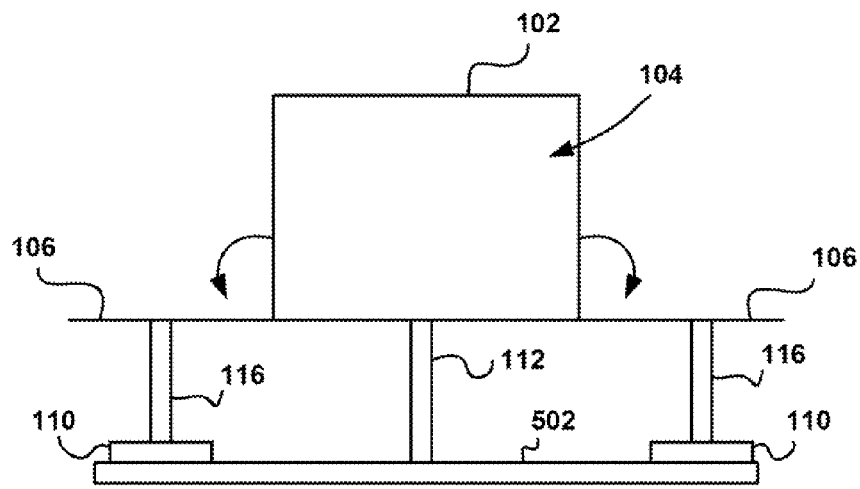
FIGS. 5B-5E show a cover of a cart being utilized as a support for a table, after converting from the cart to the table.
Figure 5C:
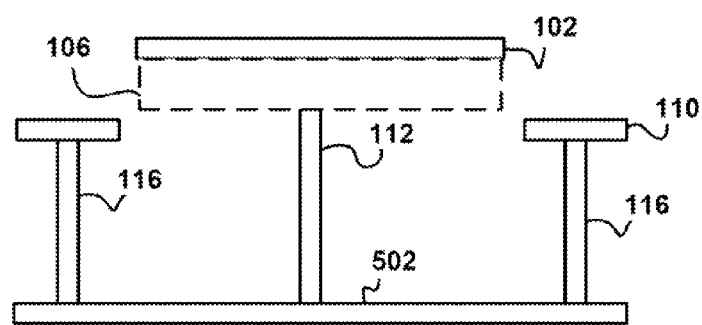
Figure 5D:
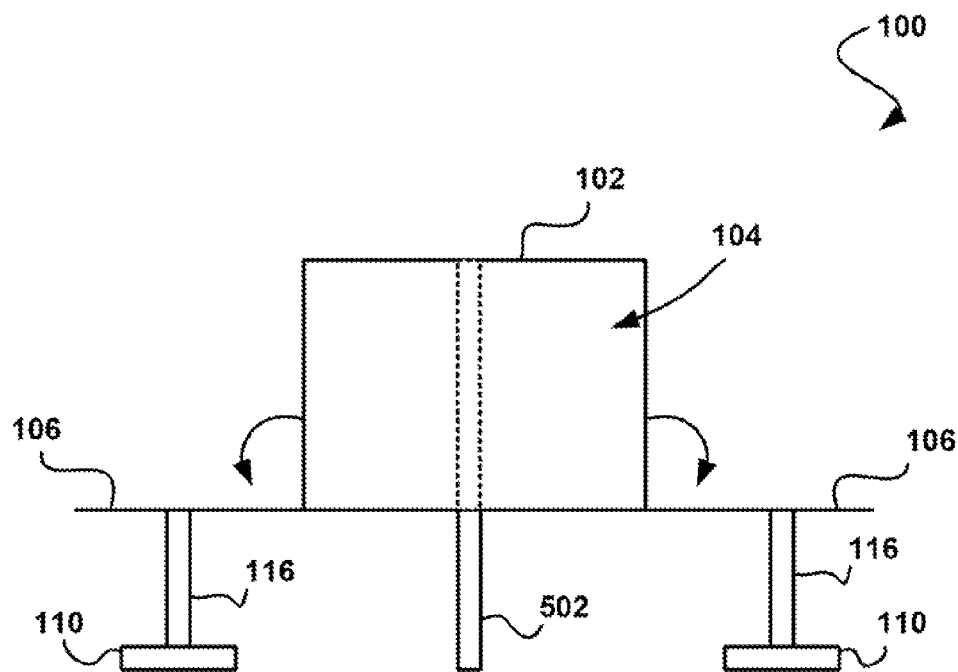

As an option, a portion of the handle 112 may be capable of being coupled to the cover 502 (e.g. see FIGS. 5B and 5C). As another option, at least one of the wheels 110 may be capable of being coupled to the cover 502, as shown in FIG. 5C. In this case, the cover 502 may serve as a base support for the at least one wheel 110 when the at least one wheel 110 is being utilized as a seat. As still another option, the cover 502 may have the ability to couple to the base 102 and serve as a support for the base 102, when the base 102 is being utilized as a top for the table, as shown in FIG. 5D.

Additionally, it should be noted that the carts described above may be constructed of any suitable material. For example, in one embodiment, the carts may be constructed of plastic. In another embodiment, the carts may be constructed of another synthetic material. As an option, the components of the cart may be color-coded or numbered for indicating placement in the cart configuration and/or the table configuration.

Furthermore, in various embodiments, the size of the cart may vary. For example, the cart may be sized to fit in a mini-van or in a trunk of a car. Furthermore, the cart may be configured such that components may be detached for easy travel or storage (e.g. the handle 112, the wheels 110, etc.). In one embodiment, the base 102 may be foldable. In this way, the base 102 may fold in at least one location to facilitate storage when traveling, for example.

Still yet, the cart 100 may include a compartment for die cover 502. As another option, mesh netting may be included with the cart as a cover. In this case, the cart 100 may also include a compartment for the mesh netting. In one embodiment, the cover 502 may be configured to contain all other components of the cart 100 when the components of the cart 100 are detached. In this way, the cover 502 may be used to store the components for travel. In one case, the cover 502 may include a plastic lip to facilitate such storage. In another case, the cover 502 may be a box shape to facilitate such storage.

Figure 5E:
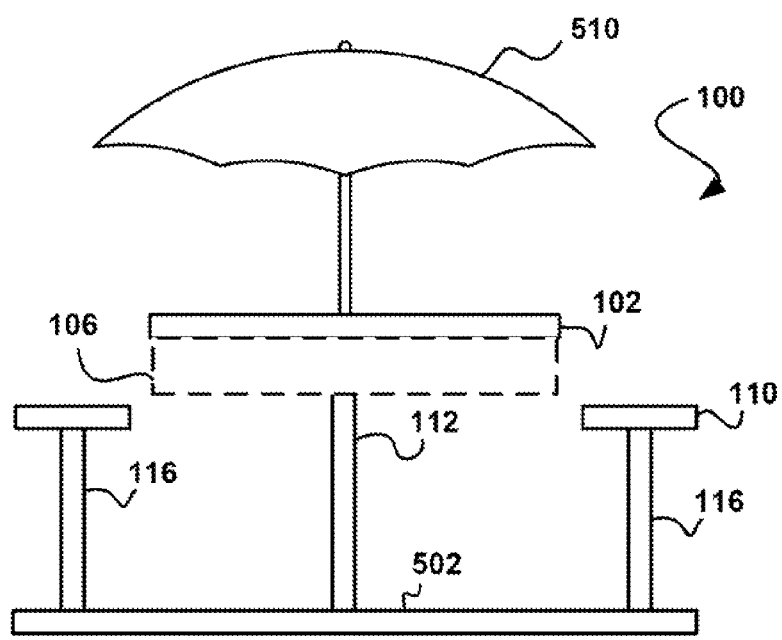

In another embodiment, the handle 112 may include a compartment. In this case, the handle 112 may include a compartment for the mesh netting. In still another embodiment, the handle 112 may include a retractable umbrella or a compartment for an umbrella. In this way, the umbrella may be extended through the handle 112 and a hole in the base 102. For example, FIG. 5E shows the cart 100 converted to a table including a retractable umbrella 510.

Figure 6A:
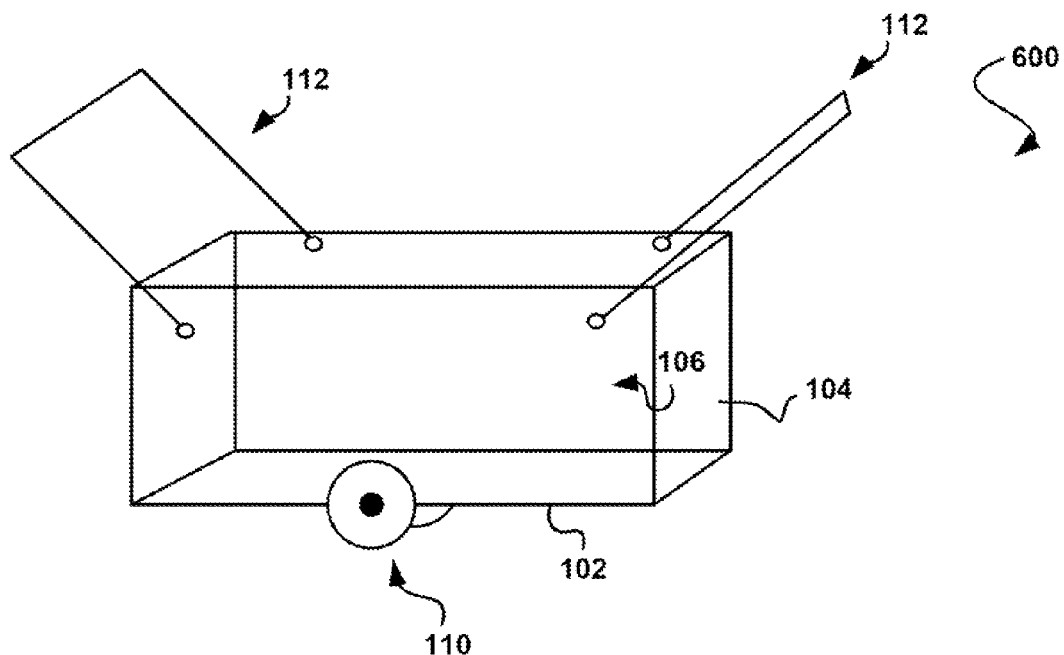
FIG. 6A shows a side view of a cart that is capable of being converted into a table utilizing only components of the cart, in accordance with yet another embodiment.

Furthermore, the cart may include any number of wheels (e.g. 2, 3, 4, etc.). As an option, the cart may include one or more handles. For example, FIG. 6A shows a side view of a cart 600 that is capable of being converted into a table utilizing only components of the cart, in accordance with yet another embodiment.

Figure 6B:
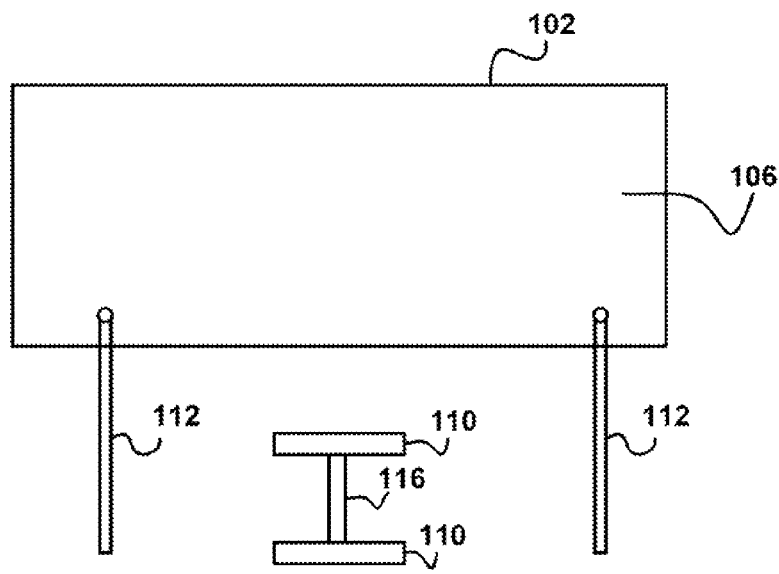
FIG. 6B shows a side view of the cart of FIG. 6A after being converted into a table, in accordance with one embodiment.

As shown, the cart 600 may include two handles 112. The handles 112 may be configured such that the handles 112 fold away from the base 102 and provide supports or table legs when the cart 600 is converted to a table (e.g. see FIG. 6B). As an option, the two handles 112 may be coupled to the sides 104. In this case, the two handles 112 may lock to the sides 104. Furthermore, the axle 116 and wheels 110 may detach and be utilized as a seat. In this case, the seat may be separated from the base 102 and the sides 106.

FIG. 7 shows a side view of a cart 700 that is capable of being converted into a table utilizing only components of the cart, in accordance with another embodiment. As shown, the sides 104 of the cart 700 may rotate such that the sides 104 may be utilized as a support for the base 102 when the base 102 is being utilized as the table. In this way, the sides 104 (or the sides 106) may be utilized as table legs.

It should be noted that, in various embodiments, the sides 104 and 106 of the cart 100 may rotate or detach in a variety of ways. For example, in one embodiment, all of the sides of the cart 100 may detach, leaving the base 102 and legs connected to the base (e.g. see legs 802 illustrated in FIGS. 8A and 8B). As an option, the legs 802 may fold inwards towards the base 102. This functionality may be utilized to facilitate breakdown for travel purposes, for example.

Figure 9A:
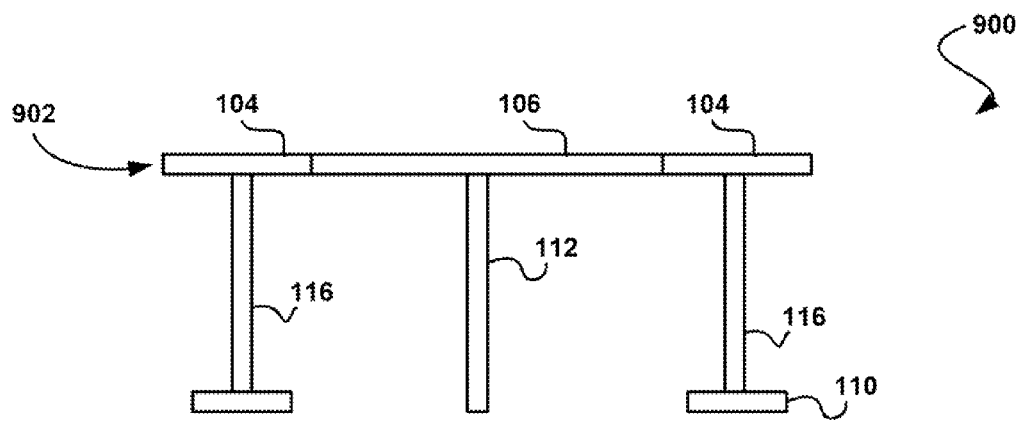
FIGS. 9A and 9B show a cart that has been converted into a table utilizing only components of the cart, in accordance with another embodiment.

In another embodiment, all of the sides may rotate to make a planar surface with the base 102, such that the base 102 and the sides may be utilized as a table top. FIG. 9A shows a side view of a cart 900 that has been convened into a table utilizing only components of the cart, in accordance with another embodiment. In cart formation, the cart 900 includes the base 102, four sides (e.g. the sides 104 and 106) coupled to the base 102, and at least two wheels 110 coupled to the base 102. As shown, the cart 900 is capable of being converted into a table, utilizing only components of the cart. In this case, the base 102 and at least one of the sides 104 and/or 106 are utilized as a table top 902. Further, at least one of the wheels 110 is utilized, at least in part, as a support for the at least one side 104 or 106.

Figure 9B:
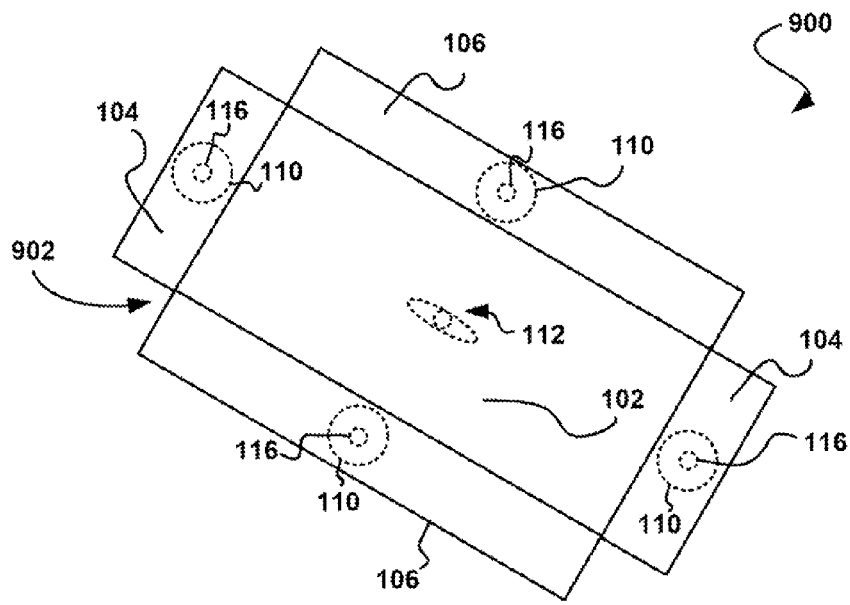

In one embodiment, all four sides may be utilized as the table top 902. In this case, four wheels may be utilized, at least in part, as a support for the sides. For example, FIG. 9B shows a top-down view of the cart 900, in accordance with one embodiment, where four wheels are utilized, at least in part, as a support for the sides. In another embodiment, at least one of the wheels 110 and/or the axles 116 may be detached from the cart 900 and utilized as a stand-alone seat. In this case, the other wheels 110 and/or axles 116 may be utilized as a support for the sides.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A cart, comprising:
a base;
four sides coupled to the base; and
at least two wheels coupled to the base;
wherein the cart is capable of being converted into a table and at least one seat spaced from the table, utilizing only components of the cart;
wherein at least one of the wheels is utilized, at least in part, for the at least one seat,
a wherein at least one of the sides is used as the at least one seat,
wherein two of the wheels are used as a base support for the at least one seat.

2. The cart of claim 1, further comprising an axle for coupling the at least two wheels to the base, wherein the axle is utilized to couple the at least one side and at least one of the two wheels, forming the at least one seat.

3. The cart of claim 2, wherein the axle is separable at a point between the two wheels of the cart.

4. The cart of claim 3, wherein a first wheel coupled to a first portion of the axle and a second wheel coupled to a second portion of the axle are each utilized as the base support for the at least one side forming the at least one seat.

5. The cart of claim 4, wherein the first portion is positioned towards a first end of the at least one side and the second portion is positioned towards a second end of the at least one side for providing the base support.

6. The cart of claim 4, wherein a length of the first and second portion of the axle is adjustable.

7. A cart, comprising:
a base;
four sides coupled to the base;
at least two wheels coupled to the base; and
an axle for coupling the at least two wheels to the base, wherein the axle comprises a single axle, the single axle being severable at a point between a first wheel and a second wheel such that two separate axle portions are formed from the single axle, wherein a first portion of the axle is coupled to the first wheel and a second portion of the axle is coupled to the second wheel,
wherein the cart is capable of being converted into a table and at least one seat, utilizing only components of the cart;
wherein at least one of the wheels and separated portion of the axle coupled thereto is utilized, at least in part, for the at least one seat.

8. The cart of claim 7, wherein the first portion of the axle and the first wheel are utilized as a first seat and the second portion of the axle and the second wheel are utilized as a second seat.

9. The cart of claim 8, wherein at least one portion of the axle has an adjustable length.

10. A cart, comprising:
a base;
four sides coupled to the base; and
at least two wheels coupled to the base; and an axle for coupling the at least two wheels to the base, wherein the axle comprises a single axle, the single axle being severable at a point between a first wheel and a second wheel such that two separate axle portions are formed from the single axle, wherein a first portion of the axle is coupled to the first wheel and a second portion of the axle is coupled to the second wheel; wherein the cart is capable of being converted into a table and at least one seat, utilizing only components of the cart;
wherein at least one of the wheels and separated portion of the axle coupled thereto is utilized, at least in part, for the at least one seat,
wherein the base is utilized as a top of the table.

11. The cart of claim 10, further comprising a handle, wherein at least a portion of the handle is used as a support for the top of the table.

12. The cart of claim 11, further comprising a cover for the cart, the cover capable of being utilized for a base support for the table.

13. The cart of claim 12, wherein the portion of the handle is capable of being coupled to the cover.

14. The cart of claim 12, wherein the at least one wheel is capable of being coupled to the cover, the cover serving as a base support for the at least one wheel when the at least one wheel is being utilized as the at least one seat.

15. A method, comprising:
converting a cart to a table using only components of the cart wherein the cart comprises: a base; four sides coupled to the base; and at least two wheels coupled to the base; wherein the cart is capable of being converted into a table and at least one seat spaced from the table, utilizing only components of the cart; wherein at least one wheel of the cart is utilized, at least in part, for at least one seat, wherein at least one of the sides is used as the at least one seat,
wherein the at least one wheel is utilized as a support base for the at least one seat.

16. The method of claim 15, wherein at least one side is utilized as the at least one seat.

17. The method of claim 16, wherein the at least one side is detached from the cart when the side is being utilized as the at least one seat.

18. The method of claim 17, wherein the at least one side is attached to the cart when the side is being utilized as the at least one seat.

19. A method, comprising:
converting a cart to a table using only components of the cart wherein the cart comprises: a base; four sides coupled to the base; and at least two wheels coupled to the base; wherein the cart is capable of being converted into a table and at least one seat spaced from the table, utilizing only components of the cart; wherein at least one wheel of the cart is utilized, at least in part, for at least one seat, wherein at least one of the sides is used as the at least one seat, wherein the at least one wheel is utilized as a support for the at least one seat.

20. The method of claim 19, wherein an axle is coupled to the at least one wheel.

21. A cart, comprising:

a base;

four sides coupled to the base;

at least two wheels coupled to the base;

an axle for coupling the at least two wheels to the base;

a handle coupled to at least one component of the cart; and a cover for the cart; wherein the axle comprises a single axle, the single axle being severable at a point between a first wheel and a second wheel such that two separate axle portions are formed from the single axle, wherein a first portion of the axle is coupled to the first wheel and a second portion of the axle is coupled to the second wheel; wherein the cart is capable of being converted into a table and at least one seat, utilizing only components of the cart;

wherein at least one of the wheels is utilized as a base support for the at least one seat;

wherein at least one of the sides is utilized for the at least one seat;

wherein at least a portion of the axle is utilized to couple the at least one of the wheels to the at least one of the sides when the at least one of the wheels is being used as the base support for the at least one seat;

wherein the base is used for a top for the table;

wherein at least a portion of the handle is used as a support for the top of the table.

* * * * *